Feb. 4, 1958  J. D. PATTON  2,821,745
PLASTIC TUBE EXTRUDER

Filed Dec. 11, 1953  3 Sheets-Sheet 1

INVENTOR.
JOHN D. PATTON
BY
W. A. Fraser
ATTY.

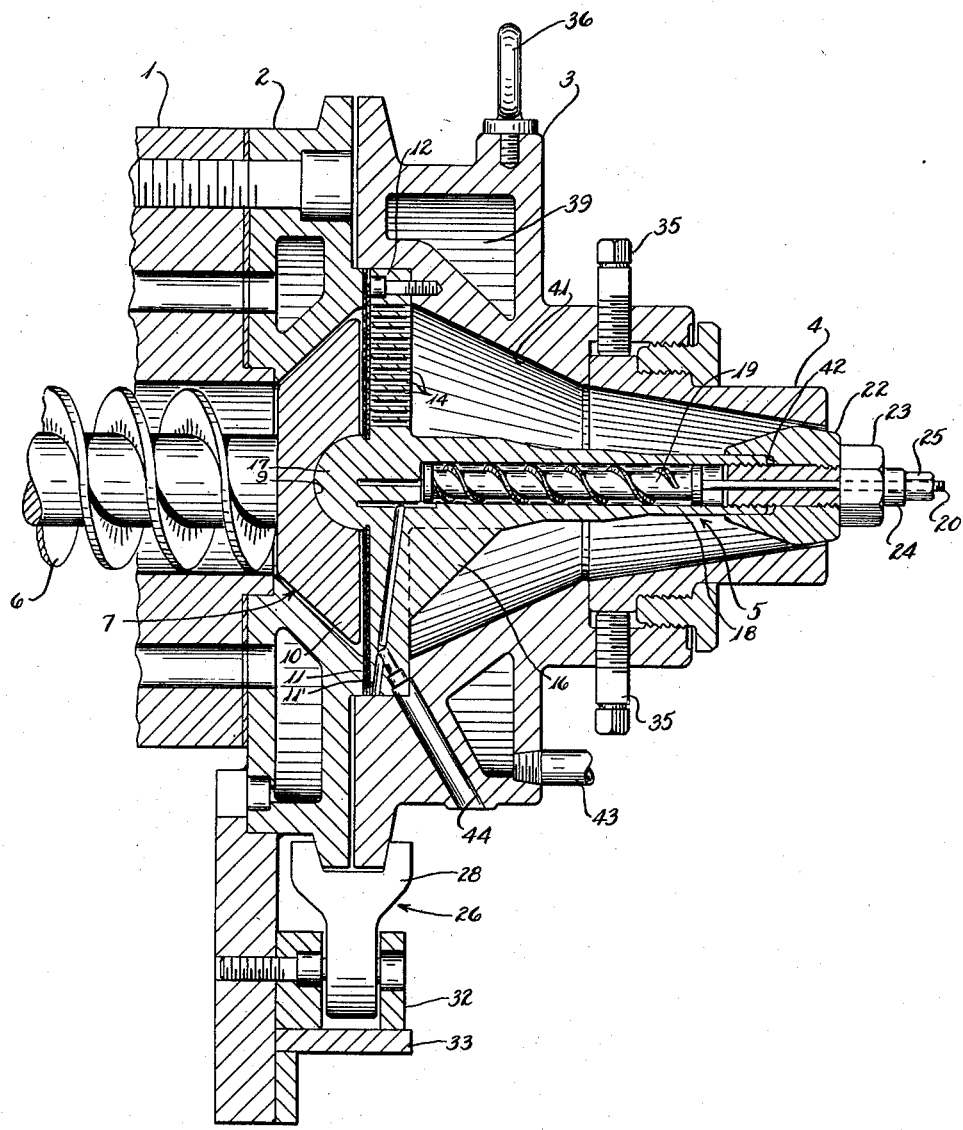

Feb. 4, 1958  J. D. PATTON  2,821,745
PLASTIC TUBE EXTRUDER
Filed Dec. 11, 1953  3 Sheets-Sheet 3
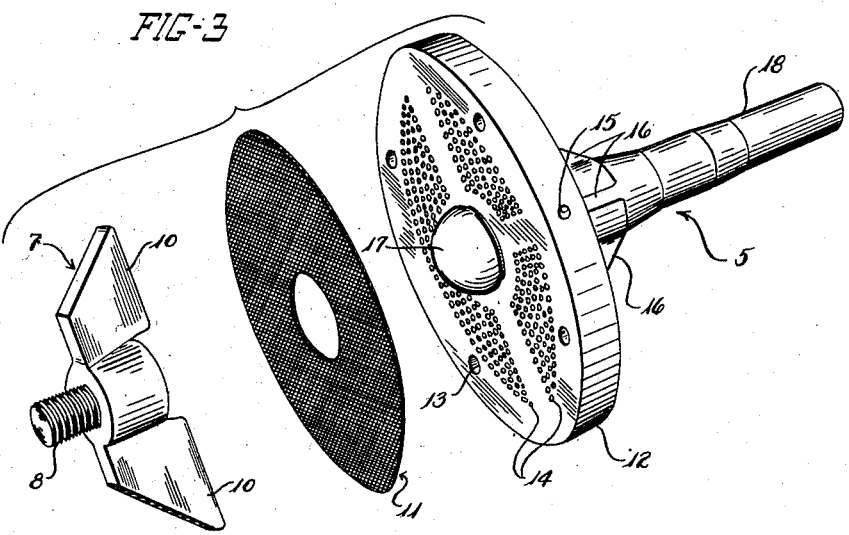
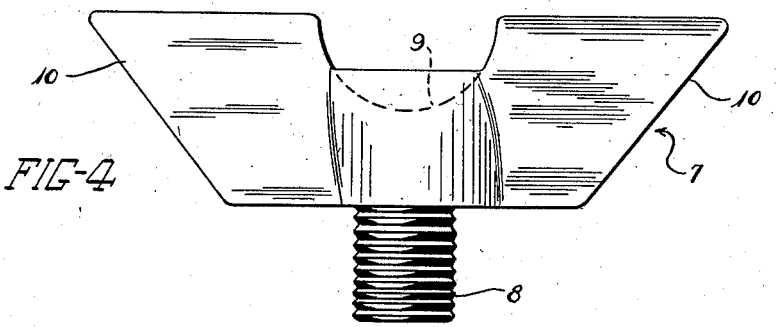
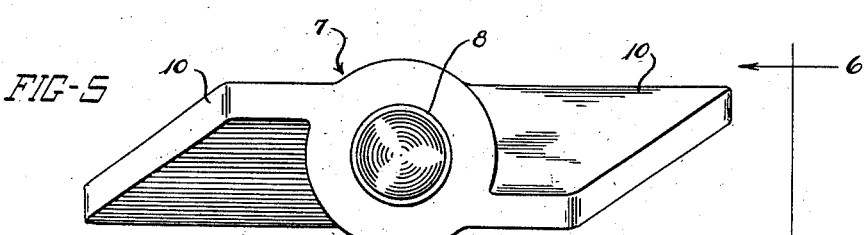
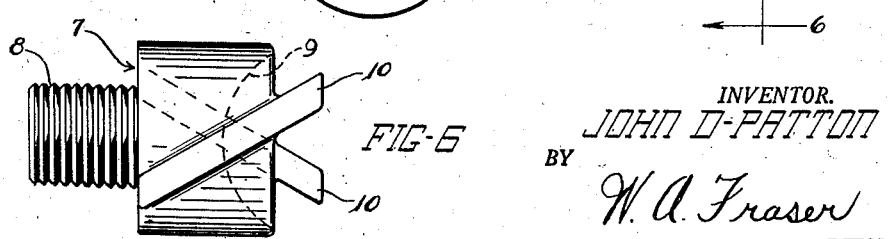
INVENTOR.
JOHN D. PATTON
BY
W. A. Fraser
ATTY.

United States Patent Office 2,821,745
Patented Feb. 4, 1958

2,821,745

PLASTIC TUBE EXTRUDER

John D. Patton, Walpole, Mass., assignor to The Firestone Tire & Rubber Company, Akron, Ohio, a corporation of Ohio Application December 11, 1953, Serial No. 397,605

7 Claims. (Cl. 18—14)

This invention relates to means for processing rubbery materials and more particularly to an extruder for forming lengths of generally tubular accurately dimensioned smooth-surfaced rubbery products.

In the manufacture of such products, quantities of compounded rubbery material are forced through the barrel of an extruder internally mounting a rotating screw having blades which have limited clearance with the inner surface of the barrel. Wiping action on the rubbery material between the screw and the inner surface of the barrel heats and masticates the material to soften it to a degree where it may be extruded readily in a desired section shape from a shaping orifice at the end of the barrel. Thus, inner tubes for pneumatic tires are manufactured by extruding rubbery material from a generally annular orifice fitted axially with a solid core called a mandrel. The mandrel is held in spaced relation from the tuber walls by a conventional bracket support known as a "spider" and the rubbery material is forced around the "spider," around the mandrel and through the orifice to form a long hollow tube which may be cut into desired lengths, cemented at the ends, spliced and vulcanized to provide the conventional inner tube.

The disadvantage of a mandrel supported by a "spider" has been that the surface of the inner tube formed by passing the rubbery material around the "spider" and over the mandrel introduces surface marks caused by the "spider." This is undesirable from an appearance standpoint and for other reasons, and it is to eliminate the disadvantages of the "spider" marks as well as to provide advantages in working the rubbery material that the present invention is directed.

By use of a combination of apparatus including a novel extruder with a strainer plate integral with a mandrel support and an impeller blade at the end of the extruder screw, the disadvantages of the prior art extruder with the "spider" mounted mandrel have been overcome.

It is therefore an object of this invention to provide in an extruder a combination of apparatus to eliminate the disadvantages of the prior art "spider" and provide for improved working of rubbery material by the extruder.

Another object of the invention is to provide an extruder equipped with means for advancing rubbery material through a strainer and around a mandrel to produce a hollow rubbery article free from foreign matter and surface marks.

A further object of the invention is to provide a strainer plate integral with a mandrel support for use in an extruder.

These and other objects of the invention will be fully understood with reference to the specification, claims and drawings of which:

Fig. 2 is a sectional view of the extruder taken along line 2—2 of Fig. 1;

Fig. 3 is an exploded view in perspective showing the relation of the screen, strainer plate and mandrel support of the invention;

Fig. 4 is a plan view of the wiper of the invention;

Fig. 5 is a front view of the wiper of Fig. 4 of the invention;

Fig. 6 is a side view of the wiper of the invention taken along line 6—6 of Fig. 5.

Figure 1:
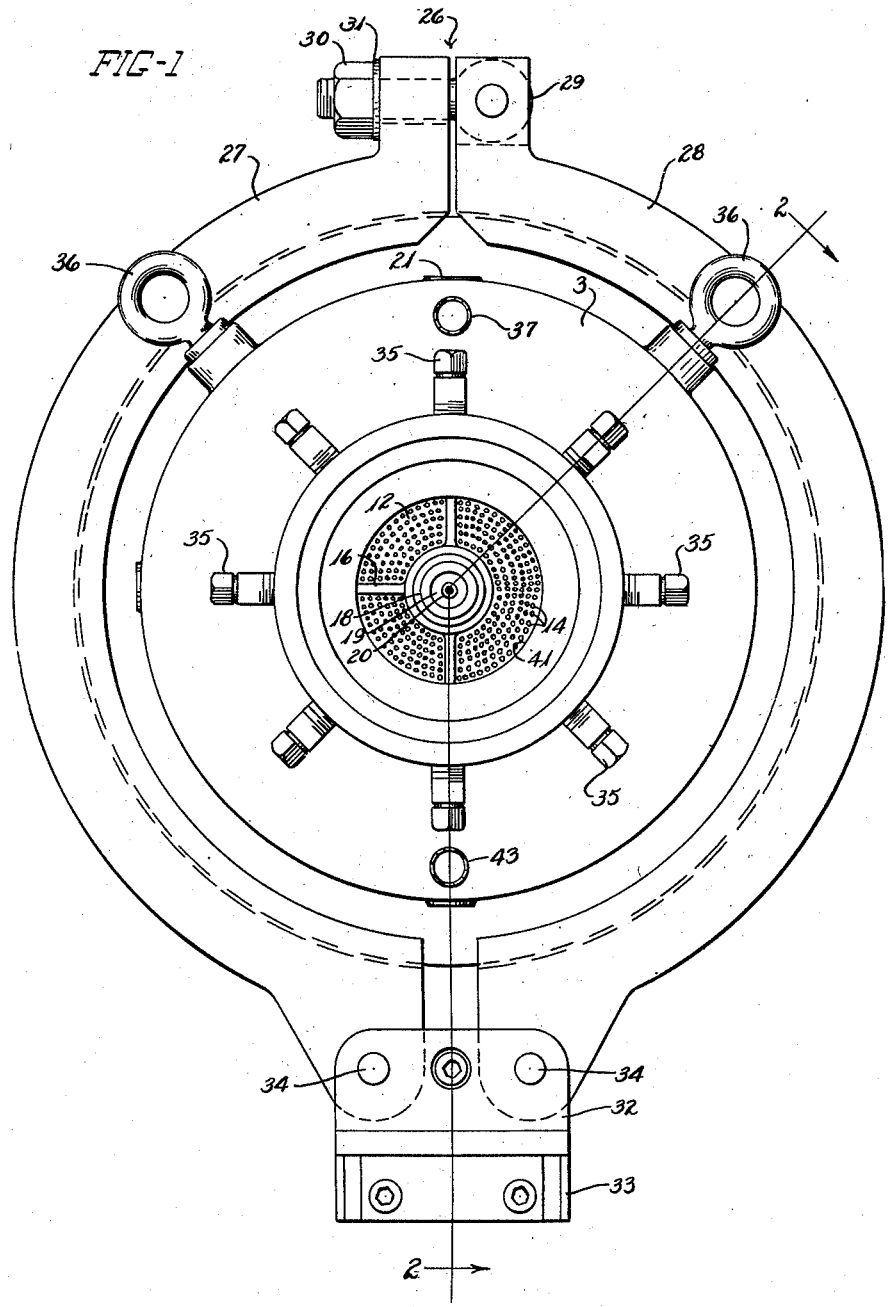
Fig. 1 is a front view of the novel extruder with a mandrel removed.

With reference to Figs. 1 and 2, an extruder is shown comprising barrel 1 mounting head adapter 2 attached to head 3 by means of clamp shoe assembly 26. Barrel 1 internally mounts rotatable screw 6 provided on the end thereof with wiper 7 mounting wiper blades 10 and relieved annularly inwardly at its end to form hollow socket 9. Mandrel strainer plate assembly 5 is mounted in chamber 41 of head 3 and is held firmly against the head adapter 2 by the pressure of the clamp shoe assembly on the head 3.

Mandrel strainer plate assembly 5 has a protrusion axially on the inboard side thereof in the form of ball 17 which fits into socket 9 of the wiper. Mandrel strainer plate assembly 5 comprises strainer plate 12 having a plurality of small passages 14 and being integral with mandrel support 18 and reinforced thereto by webs 16. Mandrel support 18 is provided with an annular passage enclosing water worm 19 drilled axially to receive soap stone tube 20. Mandrel 22 is provided with an axial bore allowing the seating of the mandrel over the end of support 18. A shoulder 42 on the inner bore of the mandrel seats on mandrel support 18, the mandrel being held firmly thereagainst by nut 23 which also is provided with an axial bore to allow soap stone tube 20. Spacer 24 separates nut 23 from centering nut 25 used to axially position soap stone tube 20 in relation to the bore of the extruder. Soap stone tube 20 is fed through means not shown connected to inlet 21, Fig. 1.

Head 3 is held to the head adapter 2 by clamping shoe assembly 26 comprising left clamping shoe 27 and right clamping shoe 28. The two clamping shoes 27 and 28 are retained in locking engagement by swivel stud 29, swiveled on right-hand clamp shoe 27 and seated when locked in a relieved portion of the left-handed clamp shoe 28 (Fig. 1). Washer 31 and hex nut 30 when tightened on swivel stud 29 provide complete locking engagement of the clamping shoes. To remove the head assembly the clamping shoe assembly is first disengaged by removing nut 30, washer 31, swing-up swivel stud 29 and allowing the left-hand and right-hand clamp shoes 27 and 28 to pivot around hinge pins 34 away from locking engagement with head 3 and head adapter 2. Hinge pins 34 are securely journaled in hinge mounting plate 32 carried on the extruder by hinge bracket 33. The cumbersome tuber head may be removed by the use of a chain hoist not shown and hooks secured in lifting eyes 36.

The tuber head 3 (Fig. 2) is heated by passing steam through inlet 37 to circulate in steam chamber 39 with condensate escaping through outlet 43. Temperature in mandrel support 18 is controlled by circulating steam or water through water inlet passage 15 (Fig. 3) in the strainer plate entering water worm chamber 19. The water worm is provided with an exit passage 44 (Fig. 2).

In operation of the novel extruder rubbery material is introduced into the feed end of extruder 1 (not shown) and advanced through the barrel of the extruder by rotation of screw 6. As the material advances through the barrel it is churned and wiped between the screw blades and the tuber wall until it is hot and mastic in which condition it advances from the end of screw 6 to wiper 7. The blades 10 of wiper 7 push the mastic material through screen 11 and strainer plate 12 into chamber 41 of the tuber head. In this chamber the material is compressed and worked by the pressure of material following through the barrel, continuous heat and pressure densifies the material as it moves through the chamber 41 and out of the end of the tuber around mandrel 22. Screen 11 or any combination of screens backed up by the strainer plate 12 removes foreign matter from the passing rubbery material. The final extruded product will be free from impurities normally picked up by rubber material stored and handled in a factory. The novel apparatus of the invention provides means for straining the rubbery material of such items as inner tubes during the last forming operation.

Since the strainer plate 12 is integral with the mandrel support 18, the usual "spider" marks on the outer surface of the extruded article caused by the mandrel support bracket of the prior art are eliminated. The rubbery material forced through strainer plate 12 has at that point in the extruding operation taken no definite shape but because of the multitude of holes 14 in the strainer plate is not only given additional mixing but enters the chamber 41 in the form of a great number of small noodles. In the chamber 41 the multitude of noodles are advanced and densified by heat and pressure until a homogeneous mass is formed which moves through the tapered chamber and is constricted in final passage between the mandrel 22 and the generally annular die 4, which is centered in the head by nuts 35. By using the novel strainer-mandrel support no marks are left on the surface of inner tubes and the rubbery material of which the tubes are composed is free from foreign matter.

While the invention has been described as used in the preparation of material for rubber articles, it is obvious that the extruder and its components may be effectively used in the processing of other rubbery or plastic material.

The temperature of the chamber 41 in the tuber head is readily controlled by the use of either hot or cold fluids circulated in chamber 39 as well as by circulation of hot or cold fluids in the water worm 19.

While preferred forms of the invention have been shown, it is to be understood that many forms are possible and many different shaped mandrels may be used in combination with the screw, wiper and strainer assembly. The size and shape of the holes in the strainer plate 12 may be varied in accordance with the requirements of the material being processed and, of course, the apparatus may be effective for some applications without the use of screen 11.

While the invention has been described in regard to a preferred form it is understood that many modifications are possible and that the invention is not limited in scope except to the extent set out in the following claims.

I claim:

1. In an extruder for shaping rubbery material the combination of a barrel having a feed end and a delivery end, a screw rotatably mounted in said barrel and adapted to advance material from said feed end to said delivery end, a head assembly including a chamber communicating with said barrel and attached to the delivery end thereof and adapted to receive material from said barrel, a shaping orifice in said head, a mandrel positioned in said orifice in spaced relation to the sides thereof, a strainer plate arranged to partition said barrel from said chamber, a wiper on the end of said screw adapted to force said material through said strainer plate, a screen abutting said strainer plate transverse said barrel, said strainer plate provided with a substantially axial hemispherical protrusion on the feed side thereof, said screw provided with an axially relieved portion in the general configuration of a socket adapted to engage said hemispherical protrusion in journal bearing engagement, said screen having a generally circular area removed from the center thereof to permit said hemispherical protrusion to extend therethrough, and an extension shaft integral with said plate extending through the chamber and supportingly engaging said mandrel.

2. In an extruder for shaping rubbery material the combination of a barrel having a feed end and a delivery end, a screw rotatably mounted in said barrel and adapted to advance material from said feed end to said delivery end, a head assembly including a chamber communicating with said barrel attached to the delivery end thereof and adapted to receive material from said barrel, a shaping orifice in said head, a mandrel positioned in said orifice and in spaced relation to the sides thereof, a strainer plate arranged to partition said barrel from said chamber, a wiper on the end of said screw adapted to force material through said strainer plate, said strainer plate provided with a substantially axial hemispherical protrusion on the feed side thereof, said screw provided with an axially relieved portion in the general configuration of a socket adapted to engage said hemispherical protrusion in journal bearing engagement, and an extension shaft integral with said plate extending through the chamber and supportingly engaging the mandrel.

3. In an extruder for shaping rubbery material the combination of a barrel having a feed end and a delivery end, a screw rotatably mounted in said barrel and adapted to advance material from said feed end to said delivery end, a head assembly including a chamber communicating with said barrel attached to the delivery end thereof and adapted to receive material from said barrel, a shaping orifice in said head, a mandrel positioned in said orifice in spaced relation to the sides thereof, a strainer plate arranged to partition said barrel from said chamber, a screen abutting said strainer plate transverse said barrel, said strainer plate provided with a substantially axial hemispherical protrusion on the feed side thereof, said screw provided with an axially relieved portion in the general configuration of a socket adapted to engage said hemispherical protrusion in journal bearing engagement, said screen having a generally circular area removed from the center thereof to permit said hemispherical protrusion to extend therethrough, and an extension shaft integral with said plate extending through the chamber and supportingly engaging the mandrel.

4. In an extruder for shaping rubbery material the combination of a barrel having a feed end, a delivery end, a screw rotatably mounted in said barrel and adapted to advance said material from said feed end to said delivery end, a head assembly including a chamber communicating with said barrel attached to the delivery end thereof and adapted to receive material from said barrel, a shaping orifice in said head, a mandrel positioned in said orifice and in spaced relation to the sides thereof, a strainer plate arranged to partition said barrel from said chamber, said strainer plate provided with a substantially axial hemispherical protrusion on the feed side thereof, said screw provided with an axially relieved portion in the general configuration of a socket adapted to engage said hemispherical protrusion in journal bearing engagement, and an extension shaft integral with said plate extending through the chamber and supportingly engaging the mandrel.

5. In an extruder for shaping rubbery material the combination of a barrel having a feed end and a delivery end, a screw rotatably mounted in said barrel and adapted to advance material from said feed end to said delivery end of said barrel, an adapter mounted on the delivery end of said barrel, a head assembly mounted on said adapter and including a chamber communicating through said adapter with said barrel and adapted to receive material from said barrel through said adapter, an orifice in said head, a mandrel positioned in said orifice in spaced relation to the sides thereof, a strainer plate arranged to partition said chamber from said adapter, said strainer plate provided with a substantially axial hemispherical protrusion on the feed side thereof, said screw provided with an axially relieved portion in the general configuration of a socket adapted to engage said hemispherical protrusion in journal bearing engagement, and an extension shaft integral with said plate extending through the chamber and supportingly engaging the mandrel.

6. An extruder for shaping rubbery material according to claim 5 wherein the strainer is faced on the feed side thereof with a number of screens adapted to remove foreign matter from said material before it advances through said strainer plate, said screens having a generally circular area removed from the center thereof to permit said hemispherical protrusion to extend therethrough.

7. In an apparatus for shaping rubbery material the combination of means having a feed and a delivery end adapted to confine said material, means rotatably mounted in said first means and adapted to advance said material through said first means from said feed end to said delivery end, a chamber communicating with said first means at the delivery end thereof and adapted to receive said material from said first means, a shaping orifice in said chamber, shaping means positioned in said orifice in spaced relation to the walls thereof, strainer means arranged to partition said first means from said chamber, means associated with said rotating means and adapted to force material through said strainer means, said strainer means provided with a substantially axial protrusion on the feed side thereof, said protrusion being defined as the volume of revolution formed by rotating a line converging from strainer to a line extending axially through its center, said rotatably-mounted means provided with an axially relieved portion in the general configuration of a socket adapted to engage said protrusion in journal bearing engagement and means associated with said strainer means for supporting said shaping means in said orifice.

References Cited in the file of this patent

UNITED STATES PATENTS

| | | |
|---|---|---|
| 791,111 | DuPont | May 30, 1905 |
| 1,603,325 | Davidson et al. | Oct. 19, 1926 |
| 2,291,212 | Clinefelter | June 28, 1942 |
| 2,512,844 | Weber | June 27, 1950 |
| 2,576,444 | Clinefelter | Nov. 27, 1951 |

FOREIGN PATENTS

| | | |
|---|---|---|
| 148,411 | Australia | Sept. 29, 1952 |
| 761,481 | Germany | Nov. 8, 1951 |
| 841,782 | Germany | June 19, 1952 |